United States Patent
Claes

(10) Patent No.: US 10,114,654 B2
(45) Date of Patent: Oct. 30, 2018

(54) METHOD OF BOOTING A PRODUCTION COMPUTER SYSTEM

(71) Applicant: Fujitsu Technology Solutions Intellectual Property GmbH, München (DE)

(72) Inventor: Heinz-Josef Claes, Nidderau (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 33 days.

(21) Appl. No.: 15/118,530

(22) PCT Filed: Jan. 27, 2015

(86) PCT No.: PCT/EP2015/051603
§ 371 (c)(1),
(2) Date: Aug. 12, 2016

(87) PCT Pub. No.: WO2015/121061
PCT Pub. Date: Aug. 20, 2015

(65) Prior Publication Data
US 2017/0060597 A1    Mar. 2, 2017

(30) Foreign Application Priority Data

Feb. 13, 2014   (DE) .......... 10 2014 101 836

(51) Int. Cl.
*G06F 9/4401* (2018.01)
*G06F 21/44* (2013.01)
(Continued)

(52) U.S. Cl.
CPC ............ *G06F 9/4406* (2013.01); *G06F 21/44* (2013.01); *G06F 21/575* (2013.01);
(Continued)

(58) Field of Classification Search
CPC .................................................... G06F 9/4406
See application file for complete search history.

(56) References Cited

U.S. PATENT DOCUMENTS 7,818,585 B2 * 10/2010 Kilian-Kehr ............ G06F 21/10
705/59
9,544,137 B1 * 1/2017 Brandwine ............. H04L 9/083
(Continued)

FOREIGN PATENT DOCUMENTS

| | | |
|---|---|---|
| EP | 2 204 754 A1 | 7/2010 |
| JP | 2009-129061 | 6/2009 |

(Continued)

OTHER PUBLICATIONS

Alfred J. Menezes et al., "Handbook of Applied Cryptography," (passage), Oct. 16, 1996, pp. 546-548.
(Continued)

*Primary Examiner* — Kim Huynh
*Assistant Examiner* — Eric Chang
(74) *Attorney, Agent, or Firm* — DLA Piper LLP (US)

(57) ABSTRACT

A method of booting a production computer system includes establishing a connection between a key computer system and the production computer system, gathering information about system data of the production computer system, transmitting the information about the system data of the production computer system to the key computer system, comparing the gathered information with comparison information stored in the key computer system, automated transmitting of a passphrase from the key computer system to the production computer system to decrypt encrypted file system date on a medium within the production computer system if the comparison is successful, decrypting the
(Continued)

encrypted file system data on the medium by the passphrase, and loading the decrypted file system data and booting the production computer system.

9 Claims, 4 Drawing Sheets

(51) Int. Cl.
   *G06F 21/57* (2013.01)
   *H04L 29/06* (2006.01)
(52) U.S. Cl.
   CPC ........ *H04L 63/0435* (2013.01); *H04L 63/062* (2013.01); *H04L 63/0876* (2013.01)

(56) References Cited

U.S. PATENT DOCUMENTS

| | | |
|---|---|---|
| 2006/0179302 A1 | 8/2006 | Hatakeyama |
| 2008/0229055 A1 | 9/2008 | Craft |

FOREIGN PATENT DOCUMENTS

| | | |
|---|---|---|
| JP | 2011-003020 | 1/2011 |
| JP | 2011-258199 | 12/2011 |
| JP | 2012-008641 | 1/2012 |
| JP | 2013-175112 | 9/2013 |

OTHER PUBLICATIONS

Wikipedia: "Password Manager," URL:http://en.wikipedia.org/w/index.php?title=Password_manager&oldid=591427978; Jan. 19, 2014.
Wikipedia: "Principle of Least Privilege," URL:http://en.wikipedia.org/w/index.php?title=Principle_of_least_privilege&oldid=592851972; Jan. 28, 2014.
Wikipedia: "Verschlüsseltes System via SSH Freischalten," URL:http://wiki.ubuntuusers.de/Verschlüsseltes_System_via_SSH_freischalten; Apr. 2011, with English translation.
Japanese Office Action dated Oct. 17, 2017, of corresponding Japanese Application No. 2016-551860 along with an English translation.

* cited by examiner

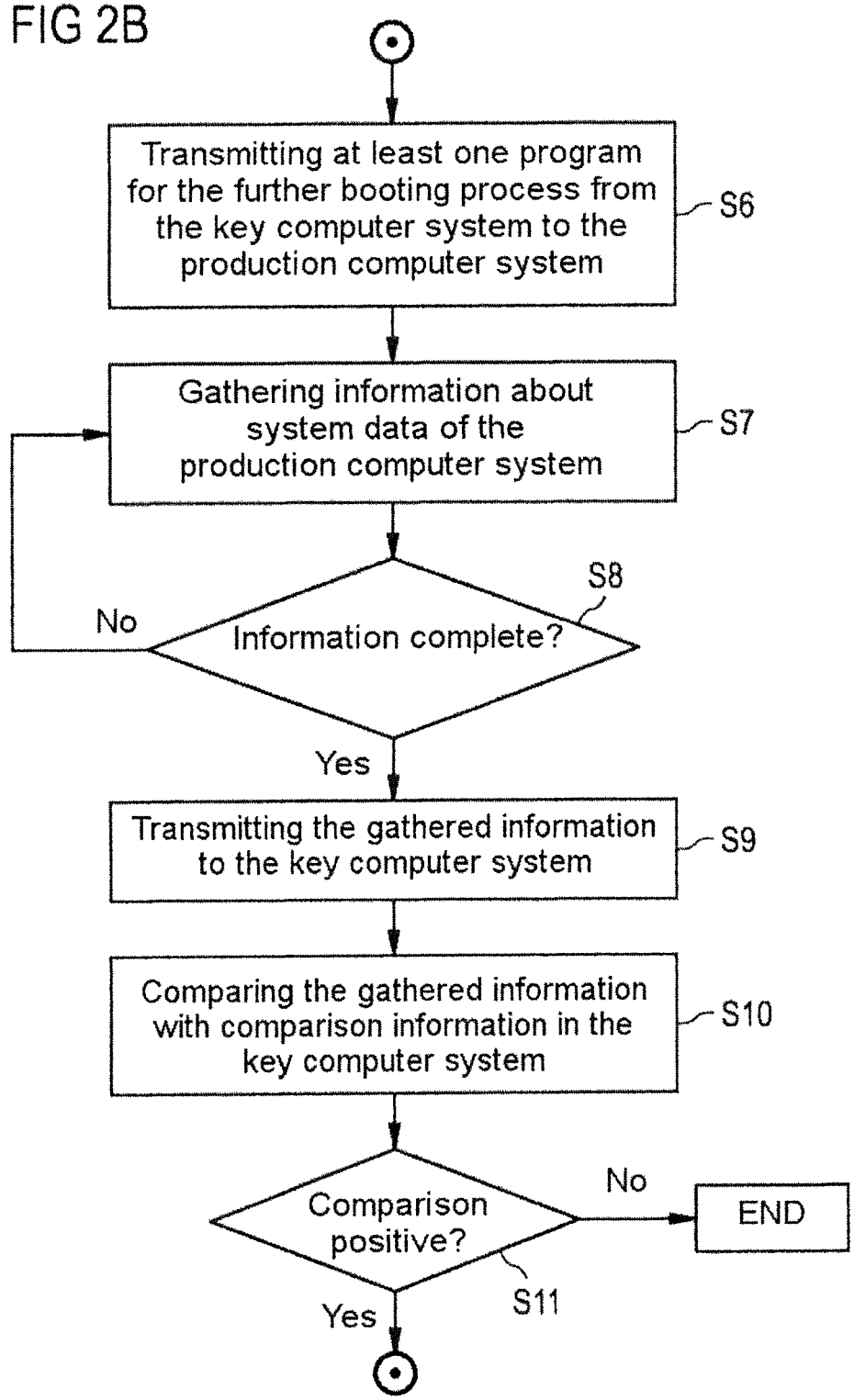

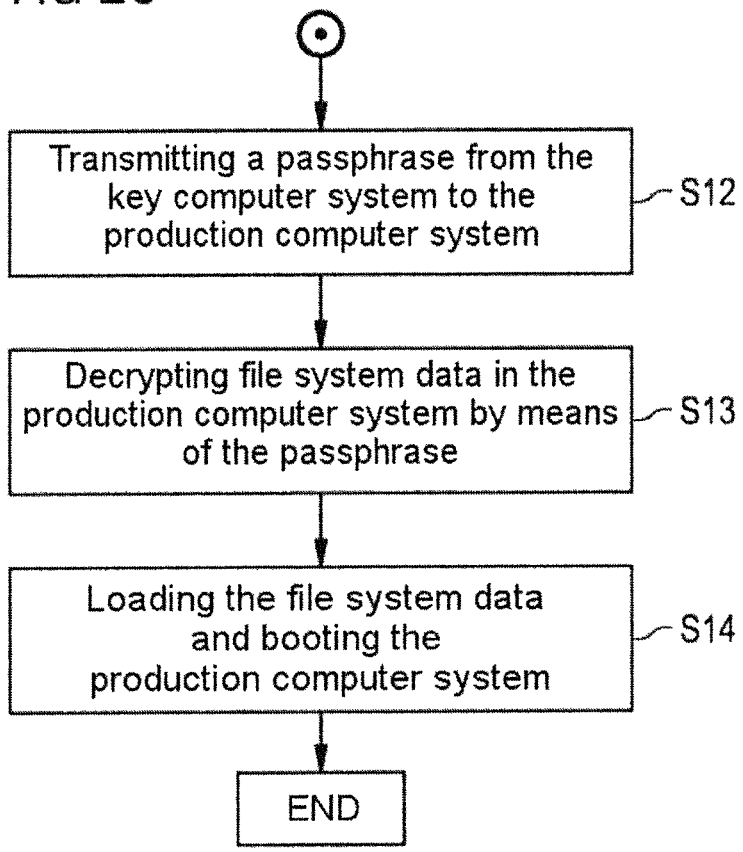

METHOD OF BOOTING A PRODUCTION COMPUTER SYSTEM

TECHNICAL FIELD

This disclosure relates to a method of booting a production computer system.

BACKGROUND

To boot a production computer system with an encrypted file system (booting, also: "booting process"), a so-called passphrase (also referred to as password, code word, key word, solution word or watch word) is required at the start of the booting process. The passphrase is a key used to encrypt or decrypt an encrypted file system in the production computer system so that the production computer system can perform a booting process by the decrypted file system.

To that end, in conventional solutions, the passphrase needs to be available in plaintext (e.g., be entered by an authorized user at the production computer system), but shall not be visible to a non-authorized third party or, possibly, for a system administrator of the production computer system. Just as well, the programs used for the booting process must not be manipulable by an administrator (or other non-authorized third parties).

Known solutions provide that a user directly enters the passphrase (e.g., on a console) prior to the actual booting process. In particular in servers it is common to start-up a so-called Secure Shell (SSH) Daemon on the encrypted file system, for example, prior to the actual booting process. An administrator logs into the daemon and enters the passphrase which is then used to decrypt the file system.

The disadvantage of known solutions is that a person is required to enter the passphrase. For example, the person may be an non-authorized third party or a criminal who uses the passphrase in an non-authorized manner to get access to the file system of the production computer system.

However, saving the passphrase with the system according to an alternative solution is an additional security gap and generally puts the sense of encryption into question, respectively.

Using a so-called "Trusted Platform Solution" (TPM) is not a further solution for a secure booting of a production computer system since TPM is supported by diverse computer systems only to a limited extent and there is a general distrust regarding the security of a solution of this type.

It could therefore be helpful to enable booting a production computer system without having to accept security-relevant limitations of the above type.

SUMMARY

I provide a method of booting a production computer system including establishing a connection between a key computer system and the production computer system, gathering information about system date of the production computer system, transmitting the information about the system data of the production computer system to the key computer system, comparing the gathered information with comparison information stored in the key computer system, automated transmitting of a passphrase from the key computer system to the production computer system to decrypt encrypted file system data on a medium within the production computer system if the comparison is successful, decrypting the encrypted file system data on the medium by the passphrase, and loading the decrypted file system data and booting the production computer system.

BRIEF DESCRIPTION OF THE DRAWINGS

FIGS. 2A to 2C are schematic flow charts of a method of automated booting a production computer system.

Figure 1:
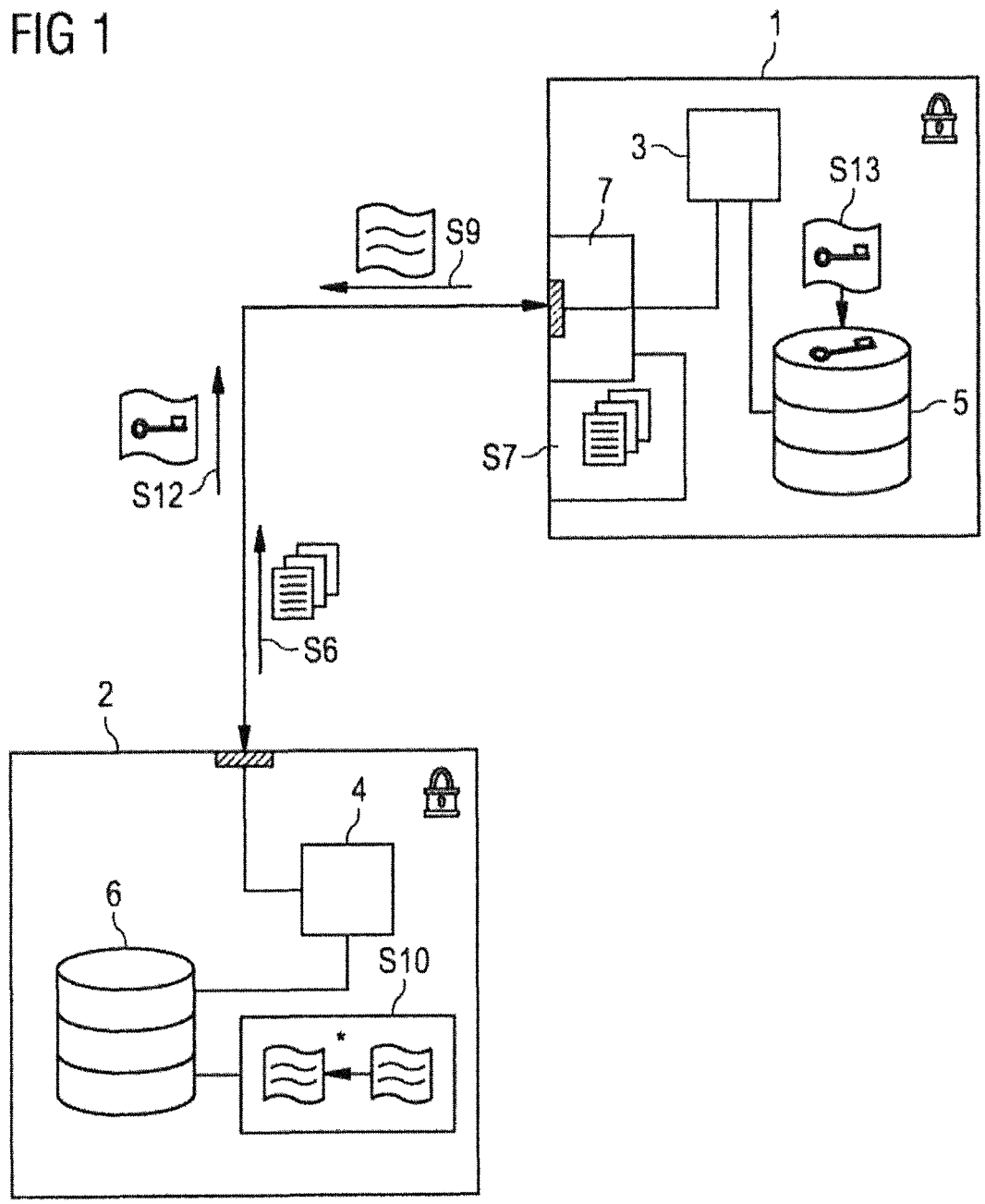
FIG. 1 is a schematic illustration of an arrangement of a production computer system and a key computer system that performs a method of automated booting of the production computer system.

LIST OF REFERENCE NUMERALS 1 production computer system
2 key computer system
3, 4 CPU
5, 6 storage medium
7 minimal system
S1 to S14 method steps

DETAILED DESCRIPTION

My method comprises the following steps:
  establishing a connection between a key computer system and a production computer system,
  gathering information about system data of the production computer system,
  transmitting the information about the system data of the production computer system to the key computer system,
  comparing the gathered information with comparison information saved in the key computer system,
  transmitting a passphrase from the key computer system to the production computer system to decrypt encrypted file system data on a medium within the production computer system if the comparison is successful,
  decrypting the encrypted file system data on the medium by the passphrase, and
  loading the decrypted file system data and booting the production computer system.

The term "production computer system" relates to a computer system set up for data processing (i.e., that is "productive"). The production computer system may be a desktop PC, e.g., a computer workstation, a server or a server system or any other type of known computer architecture.

The method is initiated when booting the production computer system is desired or required. The method finds possible application in particular within a local computer network (e.g., company network). That is, the production computer system and the key computer system need to be capable of finding one another in the network and communicating with one another. The respective computer system cannot be addressed from outside the network, which is why an automated exchange of the passphrase is not possible. That is, a production computer system cannot be booted according to the method by the key computer system when the production computer system is physically and/or logically removed from the local computer network. This way, the method may be limited to a local addressability and communication between the two computer systems.

Advantageously, the information about the system data of the production computer system includes at least one of:
  information about the available hardware,
  checksums and/or file sizes of application programs, checksums and/or file sizes of the operating system core, and complete files or mass core images.

The method step of gathering information about system data of the production computer system verifies whether the production computer system is reliable and/or known to the key computer system in its current form (i.e., with the current system state of selected or all hardware as well as software components). As a result, manipulations to the production computer system can (and shall) be detected or made much more difficult. Advantageously, the gathered information indicate such system data of the production computer system that are requested, involved and/or detected in a booting process, e.g., system data of a boot kernel or operating system core. This way, manipulation of components involved in the booting process and the decryption of the encrypted file system by the passphrase can be detected or made much more difficult so that a non-authorized phishing of the passphrase by manipulated components can be prevented.

In UNIX-based systems, gathering the above-mentioned information may be effected via "dmidecode," "disk dump" (dd). The information may be compared to comparison information in the key computer system. This way, quasi a fingerprint (footprint) of the hardware components as well as of the software components of the system to be booted is generated. As a result, an overall image of the system state of all programs available on the production computer system during this phase or of all program data is detectable, thereby allowing generation of close-mesh comparison information for a comparison according to the described method.

As an alternative or in addition to the above mentioned information, it is also possible to detect and transmit further information about programs or entire file systems or programs or file systems, respectively. This additionally complicates manipulation of the production computer system.

The gathered information about the system data of the production computer system will be further compared to comparison information stored in the key computer system. If the verification is positive, automated forwarding of the passphrase from the key computer system to the production computer system is effected. As already described above, a passphrase is a key used to encrypt or decrypt the file system data in the production computer system. Usually, a symmetric encryption method is used to that end.

During the process, file system data are initially encrypted with a so-called master key. The master key is generated from the passphrase, formed by the passphrase per se or is a key separate from the passphrase, which per se is encrypted by the passphrase. Subsequently, the file system data can be encrypted again by the master key.

According to the method described herein, the file system data comprise at least data required to boot the production computer system (i.e., for a booting process). Such data may be operating system data, program data, user data (e.g., login information), for example. In encrypted form, the file system data are worthless (or unsuccessful) insofar that a processing cannot be performed such that a successful booting process can be started. The file system data can be successfully loaded and executed only in the decrypted form (in plaintext) so that the production computer system can be booted.

In the method described, "decrypting" generally means that one or more components (e.g., operating system components, an operating system core or a booting kernel) of the production computer system can read and/or write file system data stored in the medium by the passphrase transmitted to the components and, if applicable, by a master key which may be encrypted by the passphrase per se (and thus be able to boot the system, for example).

Without decryption of the encrypted file system data in the production computer system by the transmitted passphrase, booting the production computer system is blocked as a result. It is not possible for a non-authorized third party to access the production computer system and possible confidential data.

A general advantage of the method is that the production computer system is capable of booting without further interference by an administrator or another person. Rather, a person with access to the production computer system knowing the passphrase is not required. In contrast, the passphrase advantageously remains unknown to persons with access to the production computer system (and possibly to persons with access to the key computer system) during the entire course of the method. This way, it can be ensured that a security-relevant passphrase is not misused by an authorized person, stolen by a criminal or handed-over from an authorized person to a non-authorized person. Nevertheless, automated booting of the production computer system via an automated transmission of a passphrase from the key computer system to the production computer system is possible.

The comparison of information about system data of the production computer system and comparison information stored in the key computer system presents the security barrier for performing the method successfully. In fact, manipulation of information about system data gathered on the production computer system to evade the security barrier via a manipulated boot kernel or an operating system core on the production computer system is generally possible. Nevertheless, such manipulation of the method requires substantial modifications to the operating system core in the production computer system and thus complicates manipulation of the booting process.

A (manipulative) retrieval of information about system data of the production computer system by non-authorized third parties (e.g., hackers) to a third party computer system that pretends to be the production computer system to obtain the security-relevant passphrase from the key computer system also requires substantial, elaborate manipulation, which may possibly be designed in a predictive manner. Because even slightest changes to the system state of the production computer system after such an attack (e.g., by a routine security script prior to the shut-down of the production computer system) lead to a changed system state of the production computer system, which is logged with the key computer system as comparison information. A comparison with the system data that was previously retrieved in a manipulative manner on the third party computer system will fail then so that the key computer system prohibits a transmission of the passphrase to the criminal third party computer system.

For example, physical manipulation at the production computer system can also be complicated or prevented as well as be made noticeable by mechanically effective sealings at the production computer system.

Advantageously, in the method of the type described herein, the production computer system starts a minimal system that permits access of the key computer system to the production computer system for establishing the connection. The minimal system represents some type of platform for accessing the production computer system. Thus, the minimal system is, metaphorically speaking, an "entrance door to an empty space" of the production computer system. For example, a SSH daemon may run on the minimal system.

For example, the minimal system can be started from a non-decrypted partition of a hard drive within the production computer system. However, as an alternative or in addition regarding security, it is also possible that the minimal system is stored in a read-only medium (read-only medium such as a USB storage or a compact disk drive). The production computer system may be located in a secured room or rack, for example. Then, direct access to the system by a single person is not possible (multi-eye principle). Just as well, the BIOS, in which the read-only medium to boot the minimal system is registered (boot device), is advantageously not accessible or write-protected. For example, the minimal system may be "initrd" or "initramfs," for example.

Advantageously, authentication and/or authorization of the key computer system at the minimal system of the production computer system is prompted, wherein the connection between key computer system and production computer system is established only when the authentication and/or authorization of the key computer system at the minimal system of the production computer system is successful.

"Authentication" means that the key computer system can be identified and verified per se. "Authorization" means, that the key computer system constituting a reliable system is permitted to establish a connection.

An authentication and/or authorization of the key computer system can be effected by storing credentials or other identification parameters of the key computer system (e.g., IP address, network name) in the production computer system, for example. Access to the production computer system is thus only permitted to the key computer system. Other attack attempts (of non-authorized third party computer systems) will not be successful.

Preferably, the production computer system communicates readiness for booting to the key computer system by the following measures:
  sending a specified sequence of package data from the production computer system to the key computer system, wherein the package data includes an identification of the production computer system, and
  verifying the sent package data for conformance with the predefined sequence in the key computer system.

Such measures may be effected, for example, by a so-called port knocking by a knock daemon. This provides the advantage that all network ports of the key computer system in conjunction with the method of the type described herein can be closed so that programs running at the network ports (which would be externally attackable via network) of the key computer system are not required.

However, alternatively or additionally, it is also possible that such measures include exchange of packages from a certain IP address or a certain network name. Even if such measures for identification of the production computer system are manipulated by persons with full access to the production computer system or are transmitted to third computer systems, the key computer system is capable of detecting that this is not the authorized (i.e., reliable) production computer system due to an unsuccessful comparison of information about system data of the manipulated third computer system. This way, the key computer system can generally be addressed by manipulated identifications of a pretended production computer system, but a passphrase (that could be fished by a hacker, for example) will not be sent from the key computer system to the third computer system.

Advantageously, readiness for booting is indicated so that the key computer system is capable of detecting that the production computer system intends to boot. Furthermore, the key computer system can decide whether it sends the passphrase or not. If, for example, the production computer system is in a security-critical failure state (which can be (en)coded by the sent package data) and if a booting is not advisable or prohibited, a passphrase will not be sent.

According to the method, the key computer system advantageously transmits at least one specified program to the production computer system and executes the program in the production computer system, the information about the system data of the production computer system being gathered by the program and being sent to the key computer system.

Advantageously, the program is stored on a read-only medium in the key computer system and cannot be manipulated. Advantageously, the program is statically bound and thus transmitted to the production computer system. After the transmission to the production computer system, the program is executed in a statically bound (local) manner. This prevents manipulation of the execution of the program, for example, via so-called "shared libraries" and thus manipulation at the production computer system by the running program from outside via network. Advantageously, the program is stored on the production computer system just as well in a read-only medium. Preferably, this may be effected by a multi-eyes principle. As an alternative or in addition, physical access protection to the corresponding hardware (e.g., sealings) may be provided. This prevents manipulation of the program or of the hardware or even an exchange of hardware.

As an alternative to a transmission of the program within the described method, a respective program can also be pre-stored on the production computer system. In this case, the program is also advantageously stored on a read-only medium. This may also be effected by a multi-eyes principle. As an alternative or in addition, physical access protection to the respective hardware (e.g., sealing) may here as well be provided with the respective advantages.

Advantageously, in the method of the described type, the passphrase is neither permanently nor recoverably stored neither in encrypted form nor as a plaintext in the production computer system at least while performing the method. During the method described herein, the passphrase is merely (once) used as a key to decrypt the file system data or decrypt a separate master key (which, in turn, is used to decrypt the file system data) and will not be stored permanently at any place in the production system. Preferably, even hash values of the passphrase will not be generated and/or stored in the production computer system. This is to prevent the passphrase from being fished by external attacks after decryption of the encrypted file system data and after booting the production computer system or from being visible or reproducible for users.

Preferably, in the method of the described type, the passphrase is automatically generated in the key computer system. This may be effected according to a prepared scheme (e.g., look-up table, predefined criteria), but, alternatively and/or additionally, also aleatorily (by stochastic process). It is possible to use a generated passphrase multiple times or only once (i.e., for a single booting process). It is possible to generate a passphrase only once when establishing a production computer system, to encrypt file system data (or an additional master key, where appropriate) and then store the passphrase in the key computer system in a safe manner in any booting process to be able to decrypt the file system data by the passphrase and a master key, where appropriate, using the above described method. As an alternative, it is also possible to encrypt the file system data (or, if appropriate, an additional master key) at any new booting process or at specified times in each case with a new passphrase and decrypt them correspondingly in one or multiple subsequent booting processes.

Furthermore, it is possible to encrypt the generated passphrase by an asymmetric encryption method (private/public key) once again by a public key, transmit it to the production computer system and decrypt it there by a private key. Where applicable, it is also possible to encrypt one single passphrase using multiple public keys and send it to a plurality of production computer systems to boot them according to the described method.

Preferably, in the method described herein, access of a user of a first user group to the production computer system is provided after the booting of the system, but access of a user of the first user group to the key computer system is prevented at least in a specified operating state.

A user of the first user group is not able to initiate a booting of the production computer system per se—due to a lack of knowledge of the required passphrase. The method is required to that end. Only after booting, access rights (local, if applicable) of the first user group to the production computer system may be provided. A specified operating state of the key computer system in this sense is for and while performing the method. That is, the first user group (e.g., an administrator of the production computer system) is at least prohibited to access the key computer system to generate or specify passphrases to perform the method. However, access of the first user group to the key computer system may be permanently prohibited after setting up and establishing the key computer system. For example, all network ports of the key computer system may be closed to prevent access via network so that the key computer system does not run programs that could be attacked.

As an alternative or in addition, in the method of the type described herein, access of a user of a second user group to the key computer system is provided, wherein access of a user of the second user group to the production computer system is prevented at least in a specified operating state of the production computer system.

Just as well, a specified operating state of the production computer system is for and while performing the method. That is, the second user group (e.g., a security committee that manages and/or monitors the key computer system) is not allowed to access the production computer system in a manipulative manner while booting. However, access of the second user group to the production computer system may be permanently prohibited after setting up or establishing the production computer system. For example, all network ports of the production computer system can be closed after booting the system to prevent access via network so that the production computer system does not runs any programs that could be attacked.

Further advantages are disclosed in the following description of the figures.

FIG. 1 shows a perspective illustration of an arrangement of a production computer system 1 and of a key computer system 2. One or both computer systems may be servers, for example. Advantageously, both computer systems 1 and 2 are set up within a local computer network so that both computer systems 1 and 2 are capable of addressing one another and communicating with one another. A bidirectional data connection is provided between both computer systems 1 and 2 to that end.

Both the production computer system 1 and the key computer system 2 each comprise (schematically illustrated) a CPU 3 and 4, respectively, i.e., one or multiple processor cores for data processing. Furthermore, both computer systems 1 and 2 each comprise, in an exemplary manner, at least one storage medium 5 and 6, respectively, on which data can be stored. The illustrated computer architectures are merely exemplary. As an alternative to the illustrated configuration, it is also possible to organize the storage media 5 and/or 6 within a storage network (so-called Storage Area Network, SAN) so that they are arranged outside the computer systems 1 and/or 2 but involved in the SAN.

Preferably, the production computer system 1 may be primarily set up to process and store certain user data and transmit the data to other production computer systems (not shown), if applicable. Thus, the production computer system 1 serves the operation as a database server, online service server, for example.

The key computer system 2 serves for superordinate maintenance and/or security tasks and is set up, inter alia, to trigger a controlled automated booting of the production computer system 1.

In the following, the schematic course of multiple method steps S1 to S14 is illustrated by FIG. 1 in conjunction with FIGS. 2A to 2C.

Figure 2A:
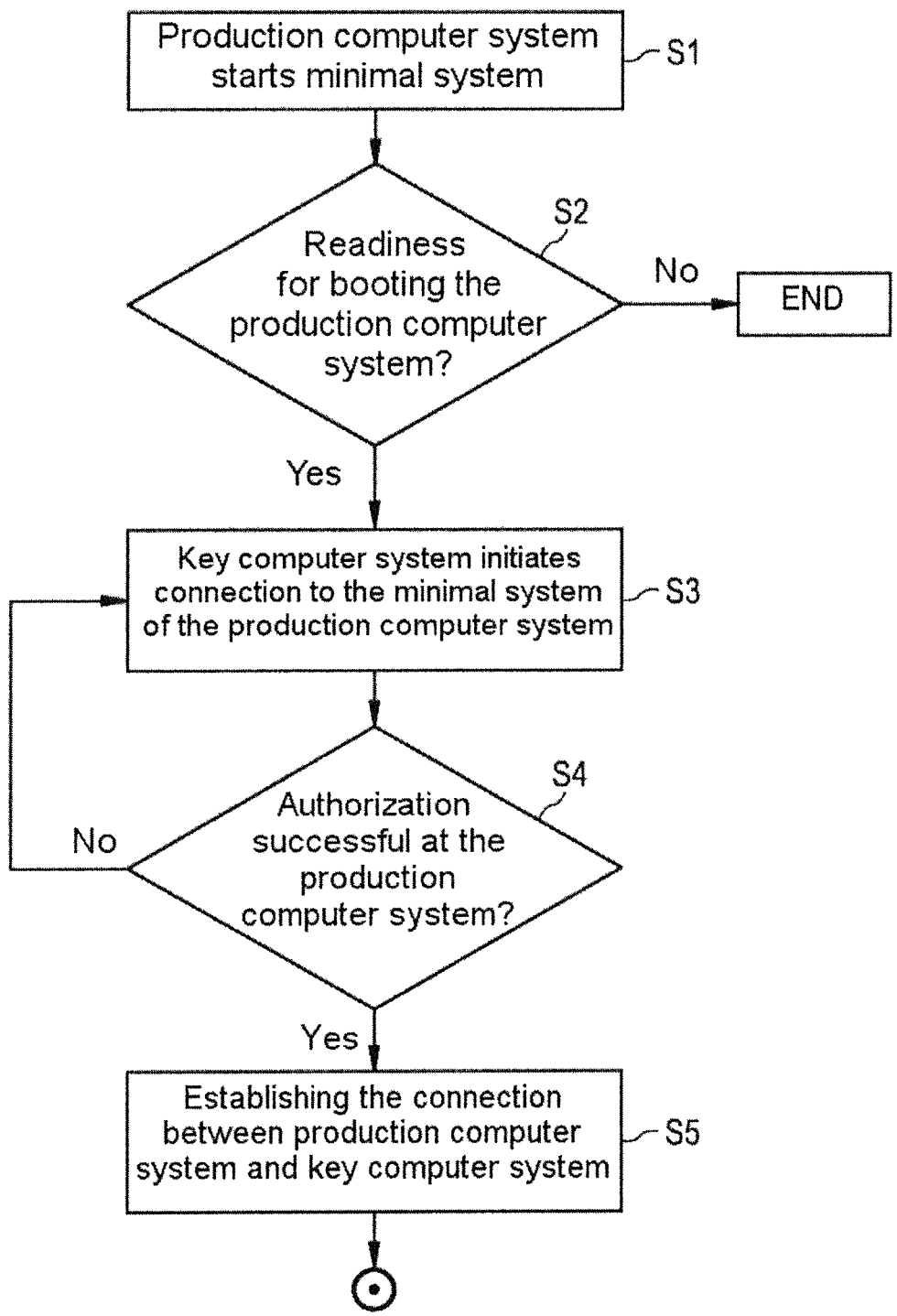

In a step S1 according to FIG. 2A, the production computer system 1 is in a state prior to the actual booting to a main operating state. The production computer system 1 may be entirely switched-off (hard-off) or be in an energy-saving mode (soft-off), in which all or selected operating components or components, respectively, of the production computer system 1 are switched-off (for example, CPU 3, storage medium 5, working memory (not shown)).

In this state, the production computer system 1 is to be booted. To that end, the production computer system starts a minimal system 7 that enables addressability or accessibility via network to the production computer system 1. For example, the minimal system 7 may be started with a non-encrypted sector of the storage medium 5 (for example, a partition of a hard drive). For example, the minimal system 7 comprises an SSH daemon that enables external addressability and accessibility to the production computer system 1. This way, the minimal system 7 forms a platform for access to the production computer system 1. Nevertheless, the access in the state is merely limited to non-encrypted data or sectors of the storage medium 5, which permit access by a minimal system 7.

In particular, in the state, access to an encrypted file system is not permitted, the system being stored in the storage medium 5 in encrypted manner. However, this file system is required to boot the production computer system 1.

In step S2 according to FIG. 2A, it is checked whether the production computer system 1 successfully indicates a readiness to boot to the key computer system 2, i.e., communicates to the key computer system 2 that it intends to boot. For example, readiness for booting of the production computer system 1 can be indicated by the latter in that the production computer system 1 sends a specified sequence of package data to the key computer system 2, thereby indicating that it intends to boot. For example, this may be effected in that a port knocking process is performed via a knock daemon at the key computer system 2 on the side of the production computer system 1. It is advantageous that all network ports can be closed at the key computer system 2 so that running programs for external access, that may be attackable, it not required.

As an alternative or in addition, the production computer system 1 may exchange, for example, even specified identification parameters (e.g., IP address, network name) with the key computer system 2, thereby indicating a respective readiness for booting.

When a readiness for booting has not been successfully indicated, the method is stopped. Otherwise, the method proceeds to step S3 according to FIG. 1 or FIG. 2A.

In this further step S3, now the key computer system 2 initiates a connection to the minimal system 7 of the production computer system 1. To that end, first, authentication and/or authorization of the key computer system 2 at the SSH daemon is effected in the minimal system 7. To that end, credentials may be verified, for example, or alternatively or additionally, further identification parameters of the key computer system 2 may be requested.

When an authorization of the key computer system 2 at the production computer system 1 has been successfully verified in step S4, connection between the production computer system 1 and the key computer system 2 is established in step S5, e.g., via SSH at the SSH daemon of the minimal system 7. Otherwise, either a renewed verification of the authorization of the key computer system 2 in step S3 according to FIG. 2A is effected, or, as an alternative, the method is stopped. Optionally, a respective failed attempt can be logged or notified. This may be decisive for security of the method.

After successfully establishing a connection in step S5 according to FIG. 2A, the key computer system 2 may communicate with the minimal system 7 of the production computer system 1 and exchange data.

In step S6 according to FIG. 1 and FIG. 2B, the key computer systems 2 transmits at least one program for the further booting process to the production computer system 1. This is schematically illustrated in FIG. 1 by a sending of multiple program scripts from the key computer system 2 to the production computer system 1.

In step S7, the at least one program which was transmitted from the key computer system 2 to the production computer system 1 in step S6, is embedded in the minimal system 7 in the production computer system 1 and executed on the production computer system 1 in a statically bound (local) manner. This is schematically illustrated in FIG. 1 within the production computer system 1. For example, the program may be "dmidecode" and/or "disk dump" (dd) in Unix-based systems.

In step S7, information about system data of the production computer system 1 are gathered by the program now running in the production computer system 1. To that end, the program may detect a footprint of all hardware or software components of the production computer system 1 and, alternatively or additionally, determine checksums and/or data sizes of individual or all program data within production computer system 1. This way, an overall image of the currently present system state in the production computer system 1 is detected and corresponding information is gathered.

If, in step S8, determination is made that information has been completely detected, the information is transmitted to the key computer system 2 in step S9. Otherwise, step S7 (gathering information in the production computer system 1) is performed further. As an alternative to the course illustrated in FIG. 2B, information need not be entirely detected at first before being transmitted to the key computer system 2. It is possible that the information is detected in parts (see step S7), then transmitted to the key computer system 2 and verified there, if applicable (see steps S9 and S10) and the further parts are detected then (see step S7), transmitted and verified, if applicable (see steps S9 and S10) or the like.

Step S9 is schematically illustrated in FIG. 1 in that information about the system state of the production computer system 1 is transmitted in the direction of the key computer system 2 to the system.

Furthermore, in step S10, a comparison of the gathered information with comparison information previously stored, e.g., on the storage medium 6 in the key computer system 2. This is schematically shown in FIG. 1 in that information gathered within the key computer system 2 is compared to stored comparison information (see star index). This comparison is to determine whether the production computer system 1 is reliable and/or known to the key computer system 2 in its current form (i.e., in the detected system state). This is to suppress that the production computer system 1 has been manipulated by a non-authorized third party to fish a security-relevant passphrase to decrypt the encrypted file system on the storage medium 5 in the production computer system 1.

Because a manipulation of the production computer system 1 (e.g., by malware, Trojans, key-loggers, phishing attacks) would change the system state of the production computer system 1 such that the gathered information (see step S7 to S9 according to FIG. 2B) does not match previously determined comparison information within the key computer system 2.

When such a comparison (see step S11 in FIG. 2B) is negative, the production computer system 1 is no longer reliable for the key computer system 2 so that the method is stopped. Booting the production computer system 1 by the encrypted file system is thus no longer possible. An non-authorized third party who may have manipulated the production computer system 1 or attempts to pretend a reliable source by a third party computer system does not have access to the production computer system 1 and possibly confidential content stored on storage medium 5.

If, however, comparison in step S11 is positive, it is changed in step S12 according to FIG. 1 and FIG. 2C. In step S12, an automated forwarding of a passphrase from the key computer system 2 to the production computer system 1 is effected. This is schematically illustrated in FIG. 1 in that a "key" is transmitted from key computer system 2 to the production computer system 1 in step S12.

The passphrase may be a master key to encrypt or decrypt the encrypted file system on storage medium 5 within the production computer system 1. The passphrase may be encrypted once again by an asymmetric crypto method (private/public keys), wherein the passphrase is respectively decrypted by a private key on the side of the production computer system 1 and is available then as a master key in plaintext to decrypt the file system.

As an alternative or in addition, it is also possible that a master key is generated from the passphrase or is a key separate from the passphrase, which is encrypted or decrypted by the passphrase per se. The master key encrypted or decrypted by the passphrase, per se, decrypts or encrypts the file system.

Finally, in step S13, a decryption of the encrypted file system data on storage medium 5 of the production computer system 1 is effected. This is schematically illustrated in FIG. 1 in that the "key" is brought together with the (at least partially) encrypted storage medium 5 within the production computer system 1. The file system data is required in plaintext to boot the production computer system 1. For example, the file system data may be program data of an operating system in the production computer system 1. It is possible to either decrypt the entire file system or only the parts that are required for a process (e.g., booting). In the latter case, the data system is not encrypted in its entirety. The passphrase is forwarded to at least one decrypting entity of the production computer system 1 via corresponding tools. Then, depending on the requirements, the entity decrypts parts of the storage medium 5 (possibly by an additional master key as described above).

After decrypting the encrypted file system data by the transmitted passphrase, the file system data can finally be loaded in step S14 according to FIG. 2C and the production computer system 1 can be booted. For example, the operating system may be fully loaded to that end.

The method ends after that.

The method described herein provides the advantage that a production computer system 1 can be booted in an automated manner under the control of a key computer system 2, wherein an encrypted file system can be decrypted by a passphrase transmitted from the key computer system 2 to the production computer system 1 in an automated manner. On the side of the production computer system 1, a person (e.g., an administrator) who triggers a booting process at the production computer system in the knowledge of the passphrase is not required. This provides the advantage that a security-critical passphrase is not transmitted to non-authorized third parties or be stolen by them.

A passphrase can be set by the key computer system 2 by a user group that has access to the key computer system 2. However, it also possible that the passphrase is generated in an automated manner by specified processes in the key computer system 2. This may provide the advantage that none of the users (neither of the production computer system 1 nor of the key computer system 2) knows a generated and transmitted passphrase. This may also increase the security measures.

Advantageously, merely authorized users of a first user group have access to the production computer system 1, but not access to the key computer system 2. Furthermore, authorized users of a second user group have access to the key computer system 2, but no access to the production computer system 1. Access via network to the respective computer system 1 or 2 may be limited, for example, in specified situations in that all network ports of computer systems 1 and 2, respectively, are entirely closed so that access is not possible via network.

All components according to FIG. 1 are merely schematically illustrated for the sake of clarity. All nomenclature is merely exemplary. The illustrated computer architecture of the production computer system 1 as well as the key computer system 2 are merely exemplary. The method procedure illustrated in FIGS. 2A to 2C is merely exemplary and can be adjusted or modified by those skilled in the art as far as permitted by the central idea of this disclosure.

The invention claimed is:

1. A method of booting a production computer system comprising:
    establishing a connection between a key computer system and the production computer system;
    transmitting at least one specified program by the key computer system to the production computer system;
    executing said specified program in the production computer system;
    gathering information about system data of the production computer system by the executed program;
    transmitting the information about the system data of the production computer system to the key computer system;
    comparing the gathered information with comparison information stored in the key computer system;
    automated transmitting of a passphrase from the key computer system to the production computer system to decrypt encrypted file system data on a medium within the production computer system if the comparison is successful;
    decrypting the encrypted file system data on the medium by the passphrase; and
    loading the decrypted file system data and booting the production computer system,
    wherein the key computer system transmits at least one specified program to the production computer system and executes said program in the production computer system, and the information about the system data of the production computer system is gathered by the program and transmitted to the key computer program.

2. The method according to claim 1, wherein the information about the system data includes at least one of
    information about the available hardware,
    checksums and/or file sizes of application programs,
    checksums and/or file sizes of an operating system core, and
    complete files or mass core images.

3. The method according to claim 1, wherein the production computer system starts a minimal system that permits access of the key computer system to the production computer system to establish the connection.

4. The method according to claim 3, wherein authentication and/or authorization of the key computer system is requested at the minimal system of the production computer system and the connection between the key computer system and the production computer system is established only if the authentication and/or authorization of the key computer system at the minimal system of the production computer system is successful.

5. The method according to claim 1, wherein the production computer system communicates readiness to boot the key computer system by:
    sending a specified sequence of package data from the production system to the key computer system, wherein the package data includes an identification of the production computer system, and
    verifying the sent package data for conformance with a predefined sequence in the key computer system.

6. The method according to claim 1, wherein the passphrase is neither permanently nor recoverably stored in the production computer system in decrypted form or in plaintext at least while performing the method.

7. The method according to claim 1, wherein the passphrase is automatically generated in the key computer system.

8. The method according to claim 1, wherein access of a user of a first user group to the production computer system is provided after the booting thereof, but access of a user of the first user group to the key computer system is prevented at least in a specified operating state of the key computer system.

9. The method according to claim 8, wherein access of a user of a second user group to the key computer system is provided, but access of a user of the second user group to the production computer system is prevented at least in a specified operating state of the production computer system.

* * * * *